US009483360B1

(12) United States Patent
Tsirkin et al.

(10) Patent No.: US 9,483,360 B1
(45) Date of Patent: Nov. 1, 2016

(54) GUEST-DRIVEN VIRTUAL MACHINE BACKUPS

(71) Applicant: Red Hat Israel, Ltd., Raanana (IL)

(72) Inventors: Michael Tsirkin, Yokneam Illit (IL); David Gilbert, Manchester (GB)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/723,401

(22) Filed: May 27, 2015

(51) Int. Cl.
*G06F 9/455* (2006.01)
*G06F 11/14* (2006.01)

(52) U.S. Cl.
CPC ....... *G06F 11/1458* (2013.01); *G06F 9/45558* (2013.01); *G06F 2009/45575* (2013.01); *G06F 2009/45583* (2013.01); *G06F 2201/815* (2013.01)

(58) Field of Classification Search
CPC ........... G06F 9/45558; G06F 11/1458; G06F 2009/45575; G06F 2009/45583; G06F 2201/815
USPC ........................................................ 718/1
See application file for complete search history.

(56) References Cited

U.S. PATENT DOCUMENTS

| 7,093,086 B1* | 8/2006 | van Rietschote ... G06F 11/1438 711/161 |
| 8,201,169 B2 | 6/2012 | Venkitachalam et al. |
| 8,650,564 B2 | 2/2014 | Huang et al. |
| 8,812,907 B1 | 8/2014 | Bissett et al. |
| 8,954,645 B2 | 2/2015 | North et al. |
| 2007/0208918 A1* | 9/2007 | Harbin ................ G06F 11/1451 711/162 |
| 2008/0098154 A1* | 4/2008 | Traut .................... G06F 9/4856 711/6 |
| 2009/0113109 A1* | 4/2009 | Nelson .................. G06F 11/203 711/6 |
| 2009/0216816 A1* | 8/2009 | Basler .................. G06F 11/1464 |
| 2009/0313447 A1* | 12/2009 | Nguyen ............... G06F 11/1451 711/162 |
| 2010/0011178 A1* | 1/2010 | Feathergill .......... G06F 11/1466 711/162 |
| 2012/0072685 A1* | 3/2012 | Otani .................. G06F 11/1451 711/162 |
| 2013/0117359 A1 | 5/2013 | Husain et al. |
| 2013/0159650 A1* | 6/2013 | Wakamiya .............. G06F 3/065 711/162 |
| 2013/0275808 A1 | 10/2013 | McNeeney et al. |
| 2014/0149696 A1* | 5/2014 | Frenkel ................ G06F 9/45558 711/162 |
| 2014/0165056 A1 | 6/2014 | Ghai et al. |

OTHER PUBLICATIONS

Minjia Zhang et al., "VirtCFT: A Transparent VM-Level Fault-Tolerant System for Virtual Clusters," IEEE Xplore Digital Library, [retrieved Mar. 31, 2015], Dec. 8-10, 2010, 2 pages, Internet: <http://ieeexplore.ieee.org/xpl/login.jsp?tp=&arnumber=5695597 &url=http%3A%2F%2Fieeexplore.ieee.org%2Fxpls%2Fabs_all. jsp%Farnumber%3D5695597>.

(Continued)

*Primary Examiner* — Qing Chen
(74) *Attorney, Agent, or Firm* — Lowenstein Sandler LLP

(57) ABSTRACT

A system and methods are disclosed for performing virtual machine (VM) backups. In accordance with one embodiment, a hypervisor executed by a processing device suspends execution of a VM and initiates a backup procedure to save a current state of the VM. The hypervisor reads a value of a flag that is written to by the VM and is stored in a portion of memory accessible by the VM and the hypervisor. In response to determining that the value read by the hypervisor equals a first value, the hypervisor resumes execution of the VM prior to receiving a status message regarding the backup procedure. In response to determining that the value read by the hypervisor equals a second value, the hypervisor waits to resume execution of the VM until the hypervisor has received a status message indicating that the backup procedure was successful.

16 Claims, 6 Drawing Sheets

(56) References Cited

OTHER PUBLICATIONS

Yang Chen et al., "Radiata: Enabling Whole System Hot-mirroring via Continual State Replication," IEEE Xplore Digital Library, [retrieved Mar. 31, 2015], Jun. 25-27, 2012, 2 pages, Internet: <http://ieeexplore.ieee.org/xpl/login.jsp?tp=&arnumber=6332209&url=http%3A%2F%2Fieeexplore.ieee.org%2Fxpls%2Fabs_all.jsp%3Farnumber%3D6332209>.

Shriram Rajagopalan et al., "Escape Capsule: Explicit State is Robust and Scalable," IBM T.J. Watson Research Center, University of British Columbia, [retrieved Mar. 31, 2015], Internet: <http://jamjoom.net/publications/jamjoom-hotos-13.pdf>.

* cited by examiner

GUEST-DRIVEN VIRTUAL MACHINE BACKUPS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
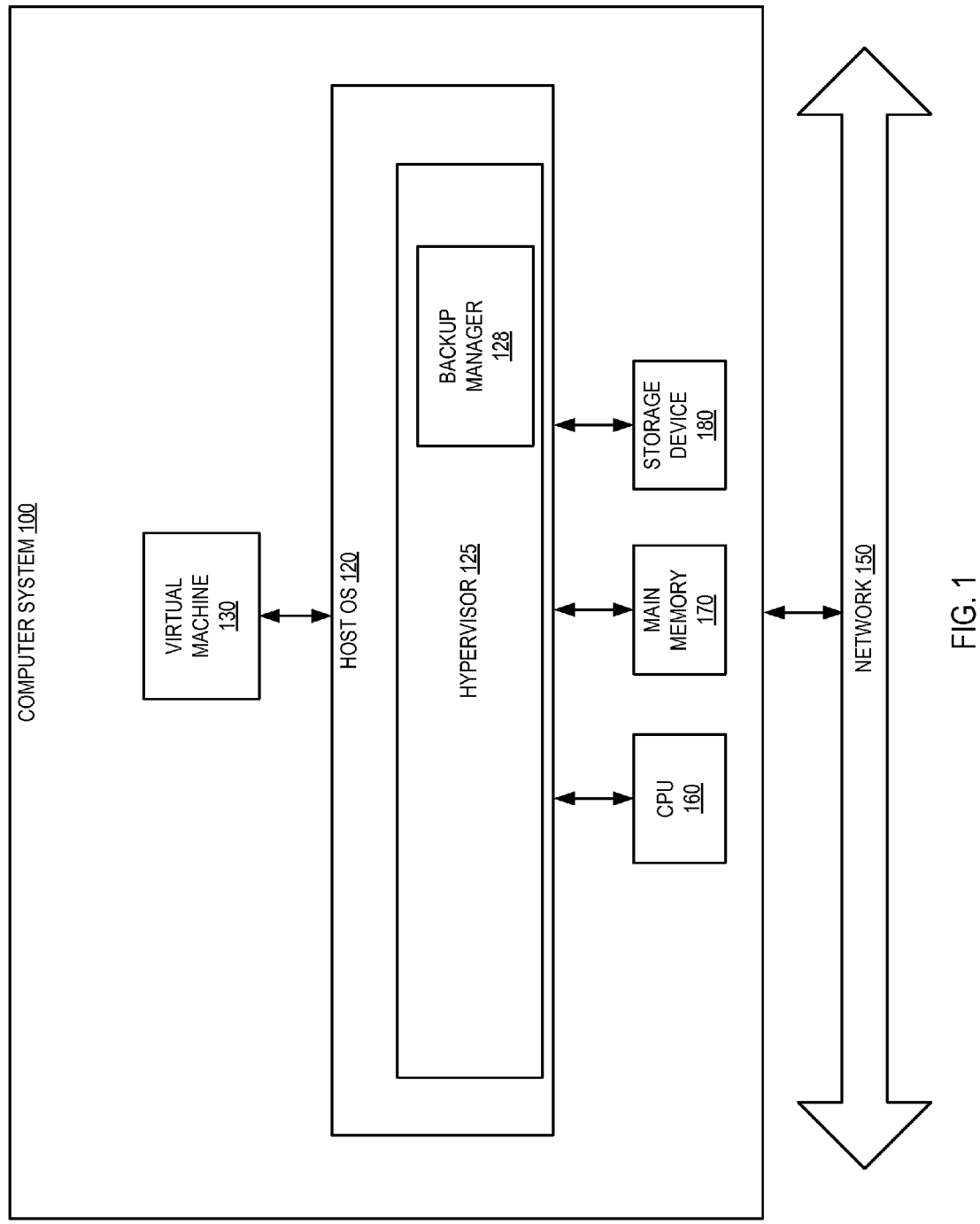
FIG. 1 depicts an illustrative computer system architecture, in accordance with an embodiment of the present disclosure.

Described herein is a system and methods for performing virtual machine backups. In accordance with one embodiment, a hypervisor executed by a processing device suspends execution of a VM (e.g., in response to an attempt by the VM to write to a device, etc.) and initiates a backup procedure to save the current state of the VM (e.g., a backup procedure that writes the current state of the VM to a storage device, a backup procedure that writes the current state of the VM to another VM, etc.). The hypervisor reads a value of a flag that is written to by the VM and is stored in a portion of memory accessible by the VM and the hypervisor. When the value read by the hypervisor equals a first value, the hypervisor resumes execution of the VM prior to receiving a status message regarding the backup procedure. When the value read by the hypervisor equals a second value, the hypervisor waits to resume execution of the VM until the hypervisor has received a status message indicating that the backup procedure was successful.

In some other embodiments, the flag written to by the VM may indicate to the hypervisor that no backup of the VM is necessary. In such embodiments, the hypervisor resumes execution of the VM without performing any backup procedure.

In one example, the hypervisor reads the flag after initiating a backup procedure, while in some other examples the hypervisor may read the flag prior to initiating a backup procedure. In some embodiments, the hypervisor is capable of detecting when the VM writes to the flag (e.g., to update the flag, etc.), while in some other embodiments the hypervisor does not detect when the VM writes to the flag.

In some embodiments, the hypervisor stores an indication that the virtual machine was backed up after receiving a status message confirming that a backup was successful. In one example, when the hypervisor does not receive a confirmation (e.g., a timeout elapses before the hypervisor receives a status message, the hypervisor receives a status message indicating that an error occurred, etc.), the hypervisor re-initiates the backup procedure.

Embodiments of the present disclosure thus enable a virtual machine to influence how and when it is backed up. For example, when performance is favored over having the most up-to-date state of the VM in case of a failure, the VM can set the flag to indicate to the hypervisor that the hypervisor can resume execution of the VM without first waiting for confirmation of a successful backup. In some embodiments, the VM can improve its performance even further by setting the flag to indicate to the hypervisor to allow VM execution to resume without performing a backup at all.

Alternatively, when a VM favors correct fault-tolerant behavior over performance, the VM can set the flag to indicate that the hypervisor should wait for confirmation of a successful backup before resuming execution of the VM. Embodiments of the present disclosure thus enable VMs to influence backups, and hypervisors to manage the backups based on VM preferences. Moreover, by employing a respective flag for each VM, backup behavior can be managed on a per-VM basis.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. It should be noted that although, for simplicity, a single virtual machine is depicted in FIG. 1, in some other embodiments computer system 100 may host a plurality of virtual machines.

Virtual machine 130 is a software implementation of a machine that executes programs as though it were an actual physical machine. In some embodiments, these programs may include one or more guest applications and a guest operating system (OS) that manages resources and provides functions such as interprocess communication, scheduling, memory management, and so forth.

In some examples virtual machine 130 may also comprise a virtual device that emulates a physical device and maps to a physical device (e.g., storage device 180, another physical device not depicted in FIG. 1, etc.). In one embodiment, hypervisor 125 manages this mapping in a transparent fashion, so that the guest OS and guest applications interact with the virtual device as though it were an actual physical device.

In accordance with one example, hypervisor 125 may include a backup manager 128 that is capable of initiating backup procedures to save the current state of one or more VMs (e.g., VM 130, etc.), of reading a flag set by a VM to indicate to backup manager 128 how backups of the VM are to be handled, of managing VM backups in accordance with the flag, and in some implementations, of detecting when a VM writes to the flag, as is described in detail below with respect to FIGS. 2 through 5. It should be noted that in some other examples, hypervisor 125 may be external to host OS 120, rather than embedded within host OS 120.

Figure 2:
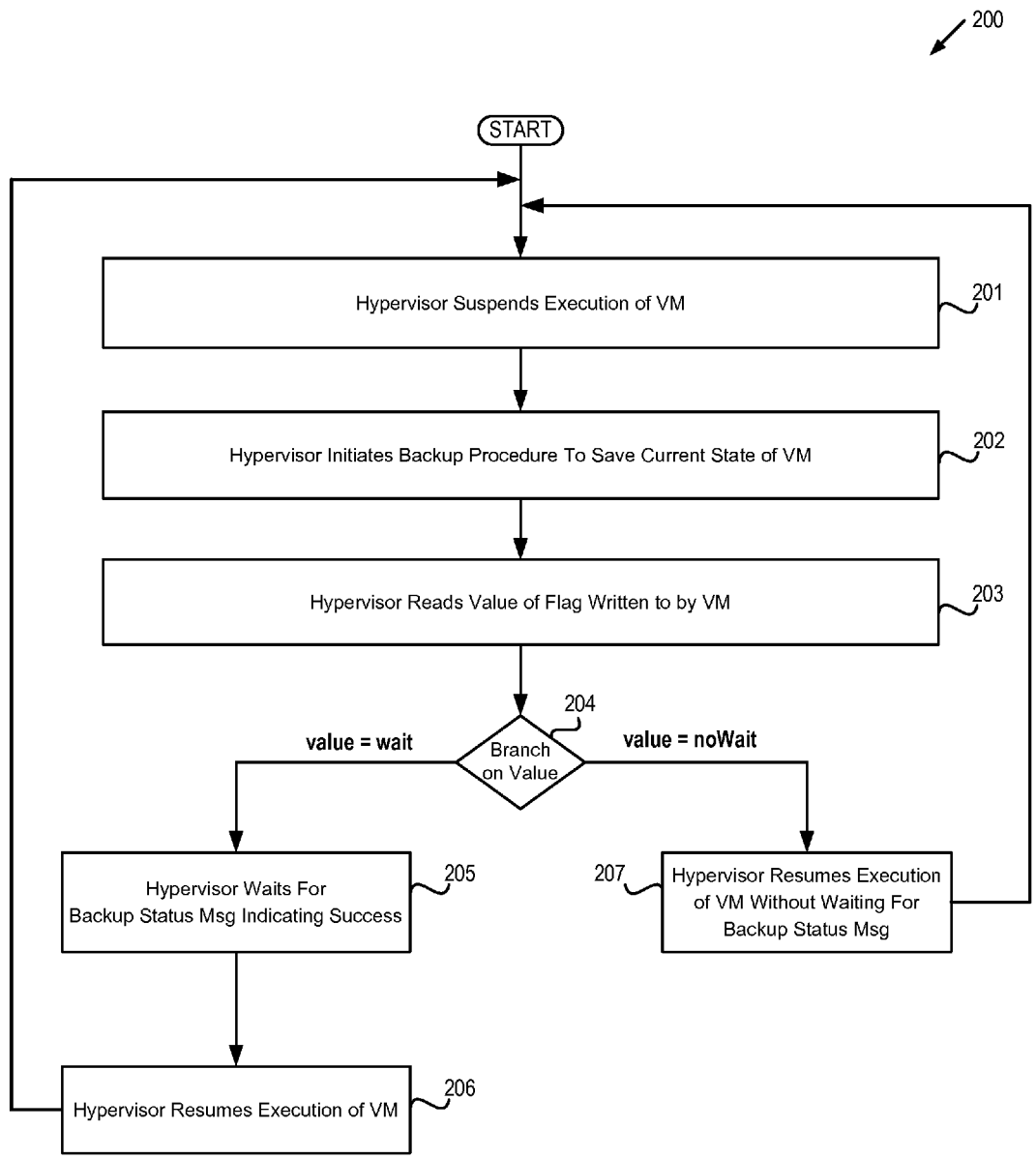
FIG. 2 depicts a flow diagram of one embodiment of a first method for performing VM backups in virtualized systems.

FIG. 2 depicts a flow diagram of one embodiment of a first method 200 for performing VM backups in virtualized systems. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted. For example, in some embodiments block 203 might be executed before block 202.

At block 201, hypervisor 125 suspends execution of virtual machine 130 (e.g., in response to an attempt by VM 130 to write to a device, etc.). At block 202, hypervisor 125 initiates a backup procedure to save the current state of VM 130 (e.g., a backup procedure that writes the current state of VM 130 to storage device 180, a backup procedure that writes the current state of VM 130 to another VM not depicted in FIG. 1, etc.). In one example, block 202 is performed by backup manager 128.

At block 203, hypervisor 125 reads the value of a flag written to by VM 130, where the flag is stored in a portion of memory 170 that is accessible by both VM 130 and hypervisor 125. In one example, the flag may be written to by VM 130 prior to VM 130 writing into a portion of memory 170 that is write-protected for VM 130, while in another example the flag may be written to by VM 130 prior to VM 130 accessing an input/output port, while in yet another example the flag may be written to by VM 130 prior to VM 130 making a hypercall (a software trap from a VM to a hypervisor, analogous to a syscall from an application to an OS kernel).

In accordance with one embodiment, hypervisor 125 is not capable of detecting when the flag is written to by VM 130. As noted above, in some implementations block 203 might be executed prior to block 202, rather than after block 202, while in some other examples blocks 202 and 203 might be executed concurrently (e.g., by different threads, etc.). In one example, block 203 is performed by backup manager 128.

At block 204, execution branches based on the value of the flag read by hypervisor 125 at block 203. In one embodiment, execution proceeds to block 204 when the value equals 'wait' (e.g., a constant established via a #define statement, etc.); otherwise, execution continues at block 207.

At block 205, hypervisor 125 waits for a backup status message indicating that the backup was successful. In one embodiment, when a backup status message is not received within a timeout period, or when a backup status message indicating an error is received, hypervisor 125 re-initiates the backup procedure and continues to wait until it has received a successful confirmation. In one example, block 205 is performed by backup manager 128.

At block 206, hypervisor 125 resumes execution of VM 130. After block 206, execution continues back at block 201.

At block 207, hypervisor 125 resumes execution of VM 130 without first waiting for a backup status message. It should be noted that a backup status message indicating an error might be received after VM 130's execution has resumed. After block 207, execution continues back at block 201.

Figure 3:
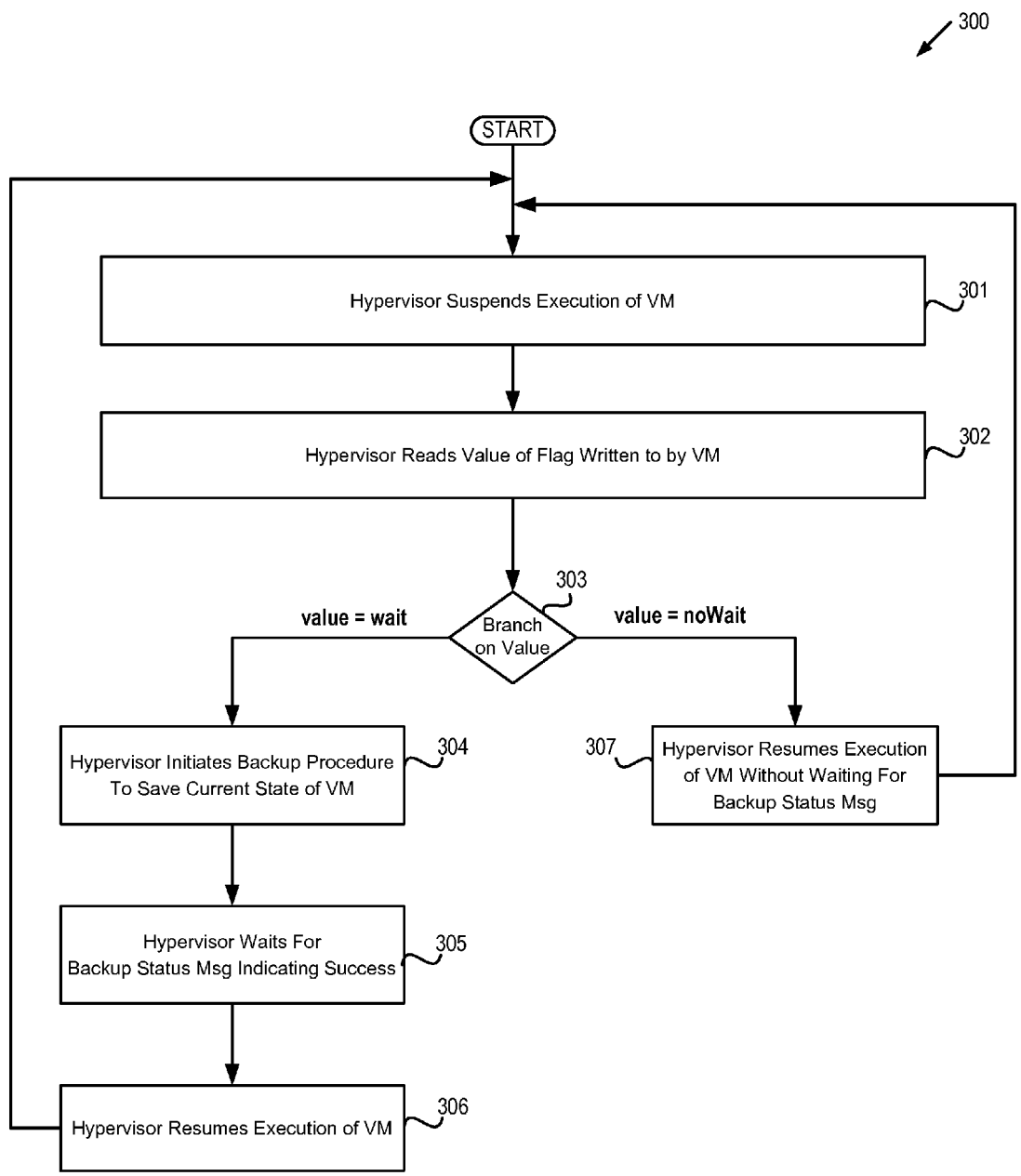
FIG. 3 depicts a flow diagram of one embodiment of a second method for performing VM backups in virtualized systems.

FIG. 3 depicts a flow diagram of one embodiment of a second method 300 for performing VM backups in virtualized systems. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted. For example, in some embodiments block 302 may be executed before block 301.

At block 301, hypervisor 125 suspends execution of virtual machine 130 (e.g., in response to an attempt by VM 130 to write to a device, etc.). At block 302, hypervisor 125 reads the value of a flag written to by VM 130, where the flag is stored in a portion of memory 170 that is accessible by both VM 130 and hypervisor 125. In one example, the flag may be written to by VM 130 prior to VM 130 writing into a portion of memory 170 that is write-protected for VM 130, while in another example the flag may be written to by VM 130 prior to VM 130 accessing an input/output port, while in yet another example the flag may be written to by VM 130 prior to VM 130 making a hypercall.

In accordance with one embodiment, hypervisor 125 is not capable of detecting when the flag is written to by VM 130. As noted above, in some implementations block 302 might be executed prior to block 301, rather than after block 301, while in some other examples blocks 301 and 302 might be executed concurrently (e.g., by different threads, etc.). In one example, block 302 is performed by backup manager 128.

At block 303, execution branches based on the value of the flag read by hypervisor 125 at block 302. In one embodiment, execution proceeds to block 304 when the value equals 'wait'; otherwise, execution continues at block 307.

At block 304, hypervisor 125 initiates a backup procedure to save the current state of VM 130 (e.g., a backup procedure that writes the current state of VM 130 to storage device 180, a backup procedure that writes the current state of VM 130 to another VM not depicted in FIG. 1, etc.).

At block 305, hypervisor 125 waits for a backup status message indicating that the backup was successful. In one embodiment, when a backup status message is not received within a timeout period, or when a backup status message indicating an error is received, hypervisor 125 re-initiates the backup procedure and continues to wait until it has received a successful confirmation. In one example, block 305 is performed by backup manager 128.

At block 306, hypervisor 125 resumes execution of VM 130. After block 306, execution continues back at block 301.

At block 307, hypervisor 125 resumes execution of VM 130 without first waiting for a backup status message. It should be noted that a backup status message indicating an error might be received after VM 130's execution has resumed. After block 307, execution continues back at block 301.

Figure 4:
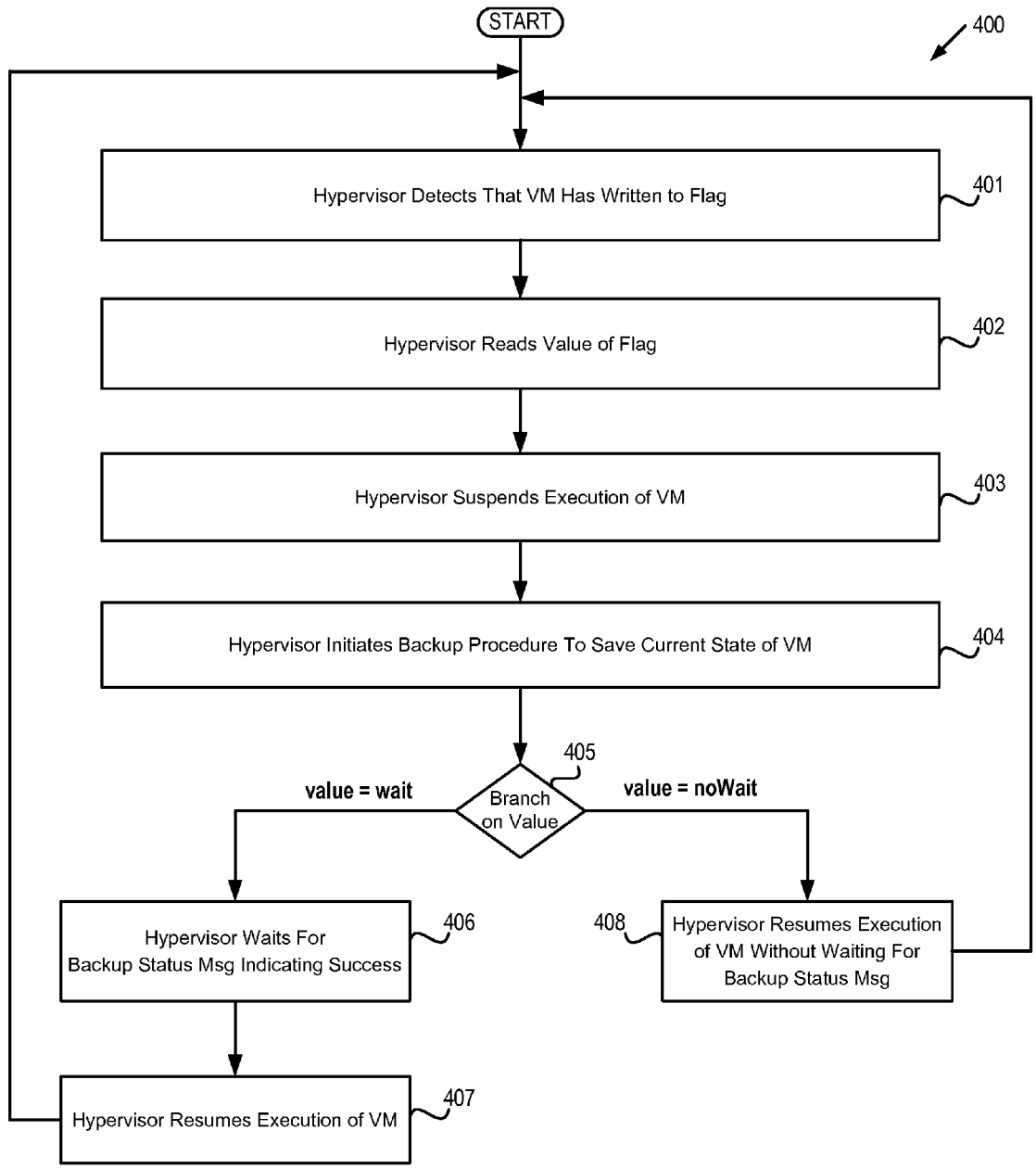
FIG. 4 depicts a flow diagram of one embodiment of a third method for performing VM backups in virtualized systems.

FIG. 4 depicts a flow diagram of one embodiment of a third method 400 for performing VM backups in virtualized systems. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 4 may be performed simultaneously or in a different order than that depicted.

At block 401, hypervisor 125 detects that virtual machine 130 has written to a flag that is stored in a portion of memory 170 accessible by both VM 130 and hypervisor 125. In one example, the flag may be written to by VM 130 prior to VM 130 writing into a portion of memory 170 that is write-protected for VM 130, while in another example the flag may be written to by VM 130 prior to VM 130 accessing an input/output port, while in yet another example the flag may be written to by VM 130 prior to VM 130 making a hypercall. At block 402, hypervisor 125 reads the value of the flag.

At block 403, hypervisor 125 suspends execution of virtual machine 130 (e.g., in response to an attempt by VM 130 to write to a device, etc.). At block 404, hypervisor 125 initiates a backup procedure to save the current state of VM 130 (e.g., a backup procedure that writes the current state of VM 130 to storage device 180, a backup procedure that writes the current state of VM 130 to another VM not depicted in FIG. 1, etc.). In one example, block 404 is performed by backup manager 128.

At block 405, execution branches based on the value of the flag read by hypervisor 125 at block 402. In one embodiment, execution proceeds to block 406 when the value equals 'wait'; otherwise, execution continues at block 408.

At block 406, hypervisor 125 waits for a backup status message indicating that the backup was successful. In one embodiment, when a backup status message is not received within a timeout period, or when a backup status message indicating an error is received, hypervisor 125 re-initiates the backup procedure and continues to wait until it has received a successful confirmation. In one example, block 406 is performed by backup manager 128.

At block 407, hypervisor 125 resumes execution of VM 130. After block 407, execution continues back at block 401.

At block 408, hypervisor 125 resumes execution of VM 130 without first waiting for a backup status message. It should be noted that a backup status message indicating an error might be received after VM 130's execution has resumed. After block 408, execution continues back at block 401.

Figure 5:
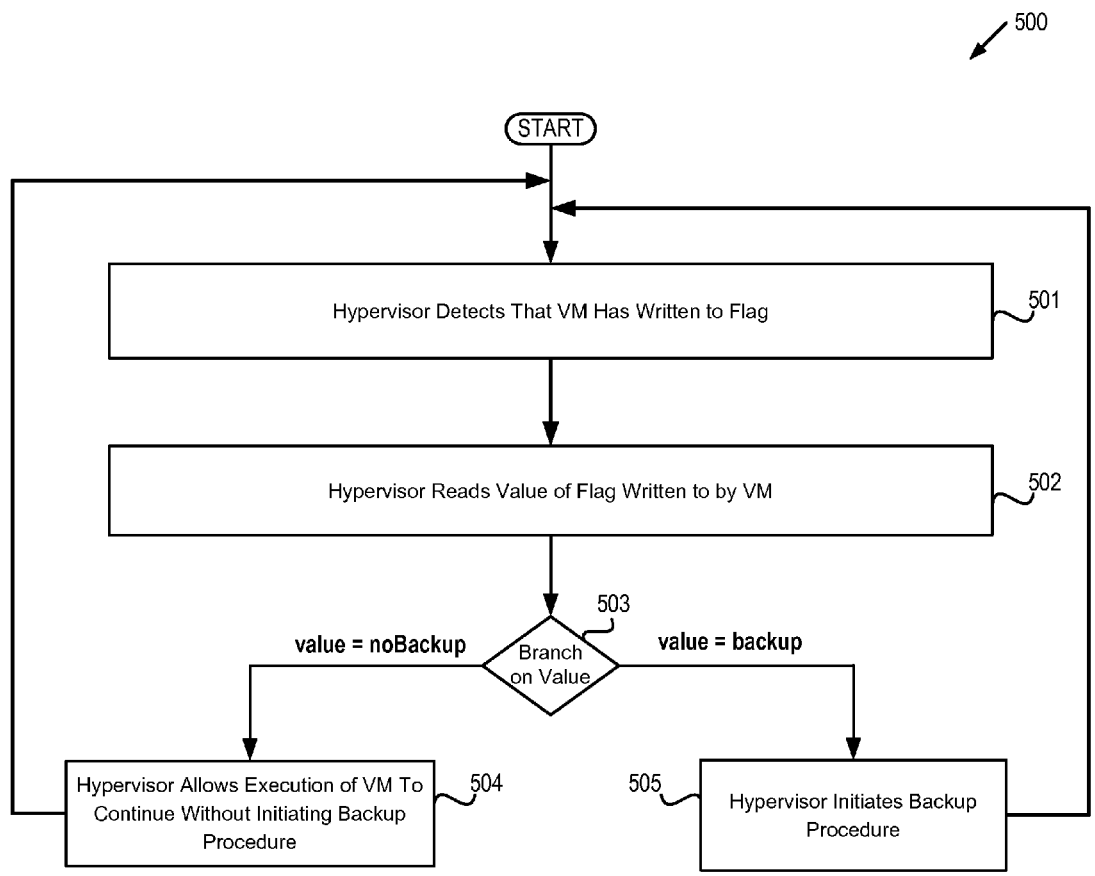
FIG. 5 depicts a flow diagram of one embodiment of a first method for performing VM backups in virtualized systems.

FIG. 5 depicts a flow diagram of one embodiment of a fourth method 500 for performing VM backups in virtualized systems. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 4 may be performed simultaneously or in a different order than that depicted.

At block 501, hypervisor 125 detects that virtual machine 130 has written to a flag that is stored in a portion of memory 170 accessible by both VM 130 and hypervisor 125. In one example, the flag may be written to by VM 130 prior to VM 130 writing into a portion of memory 170 that is write-protected for VM 130, while in another example the flag may be written to by VM 130 prior to VM 130 accessing an input/output port, while in yet another example the flag may be written to by VM 130 prior to VM 130 making a hypercall. At block 502, hypervisor 125 reads the value of the flag.

At block 503, execution branches based on the value of the flag read by hypervisor 125 at block 502. In one embodiment, execution proceeds to block 504 when the value equals 'noBackup' (e.g., a constant established via a #define statement, etc.); otherwise, execution continues at block 505.

At block 504, hypervisor 125 allows the execution of VM 130 to continue without initiating any backup procedure. After block 504, execution continues back at block 501.

At block 505, hypervisor 125 initiates a backup procedure to save the current state of VM 130 (e.g., a backup procedure that writes the current state of VM 130 to storage device 180, a backup procedure that writes the current state of VM 130 to another VM not depicted in FIG. 1, etc.). In some embodiments, hypervisor 125 might suspend the execution of VM 130 before initiating the backup procedure at block 505, and then resume execution of VM 130 after a successful backup, while in some other embodiments VM 130 might not be suspended in view of the backup.

In one example, block 505 is performed by backup manager 128. After block 505, execution continues back at block 501.

Figure 6:
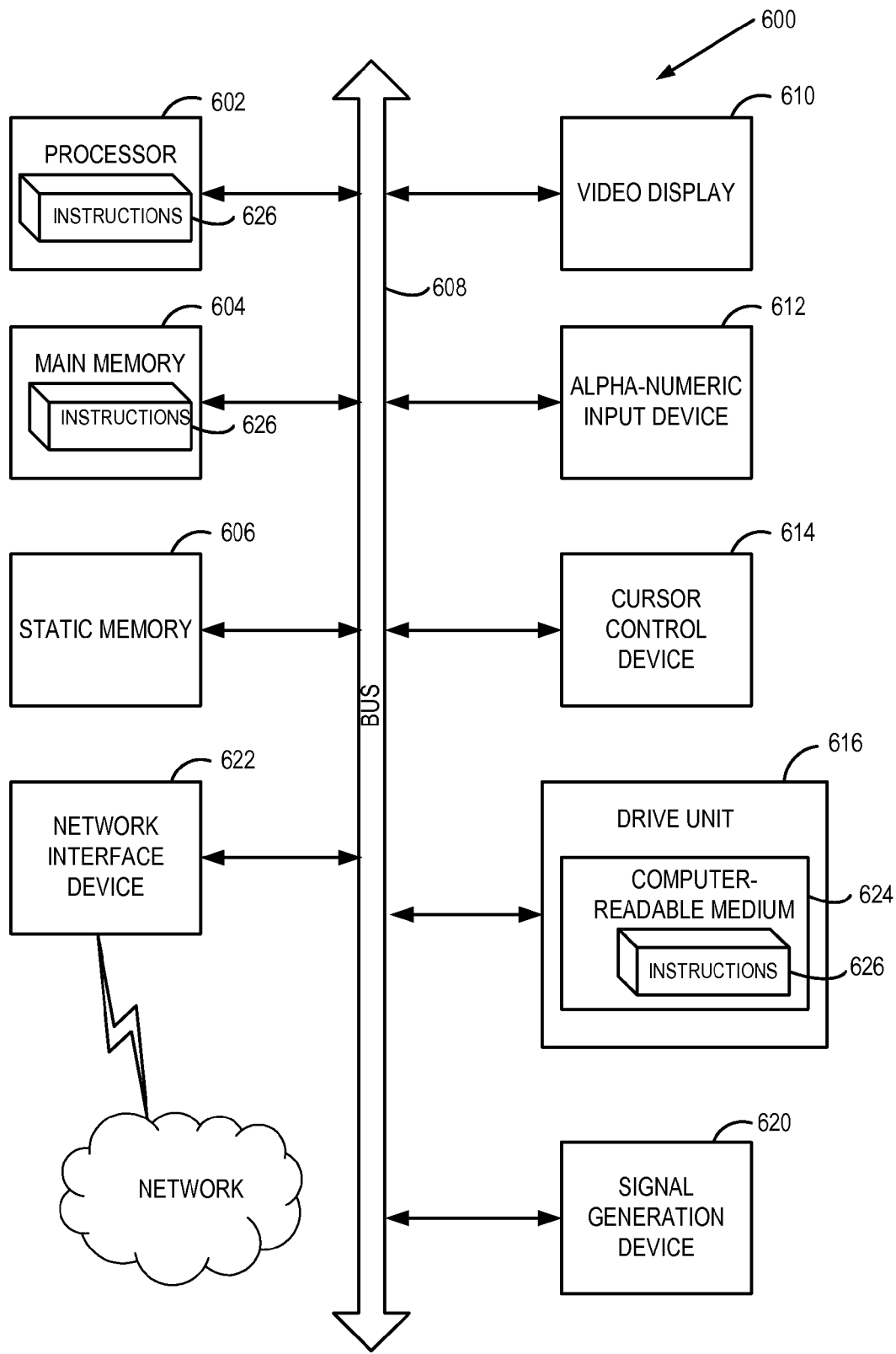
FIG. 6 depicts a block diagram of an illustrative computer system operating in accordance with embodiments of the disclosure.

FIG. 6 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to the methods of FIGS. 2 through 5, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "reading", "detecting", "initiating", "writing", "suspending", "resuming", "waiting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   suspending, by a hypervisor executed by a processing device, execution of a virtual machine;
   initiating, by the hypervisor, after the suspending, a backup procedure to save a current state of the virtual machine;
   reading, by the hypervisor, a value of a flag that is written to by the virtual machine and is stored in a portion of a memory accessible by the virtual machine and the hypervisor;
   responsive to determining that the value of the flag read by the hypervisor equals a first value, resuming, by the hypervisor, execution of the virtual machine prior to receiving a backup status message regarding the backup procedure; and
   responsive to determining that the value of the flag read by the hypervisor equals a second value, waiting, by the hypervisor, to resume execution of the virtual machine until receiving a backup status message indicating that the backup procedure was successful.

2. The method of claim 1 wherein the hypervisor resumes execution of the virtual machine prior to receiving the backup status message, and wherein the backup status message indicates that an error has occurred.

3. The method of claim 1 wherein the hypervisor re-initiates the backup procedure in response to a timeout or an error.

4. The method of claim 1 wherein the hypervisor reads the value of the flag after the initiating of the backup procedure.

5. The method of claim 1 wherein the flag is updated by the virtual machine, and wherein the updating of the flag is not detected by the hypervisor.

6. The method of claim 1 wherein the backup procedure comprises writing the current state of the virtual machine to a storage device.

7. The method of claim 1 wherein the backup procedure comprises writing the current state of the virtual machine to another virtual machine.

8. An apparatus comprising:
   a memory; and
   a processing device, operatively coupled to the memory, to:
   execute a hypervisor,
   suspend, via the hypervisor, execution of a virtual machine,
   read, via the hypervisor, a value of a flag that is written to by the virtual machine and is stored in a portion of the memory accessible by the virtual machine and the hypervisor,
   responsive to determining that the value of the flag read by the hypervisor equals a first value, resume, via the hypervisor, execution of the virtual machine prior to receiving a backup status message regarding a backup procedure to save a current state of the virtual machine, and
   responsive to determining that the value of the flag read by the hypervisor equals a second value, initiate, via the hypervisor, the backup procedure to save the current state of the virtual machine and wait, via the hypervisor, to resume execution of the virtual machine until receiving a backup status message indicating that the backup procedure was successful.

9. The apparatus of claim 8 wherein, when the backup procedure is successful, the hypervisor stores an indication that the virtual machine was backed up.

10. The apparatus of claim 8 wherein the hypervisor suspends execution of the virtual machine in response to an attempt by the virtual machine to write to a device.

11. The apparatus of claim 8 wherein the backup procedure comprises writing the current state of the virtual machine to a storage device.

12. The apparatus of claim 8 wherein the backup procedure comprises writing the current state of the virtual machine to another virtual machine.

13. A non-transitory computer-readable medium having instructions stored therein which, when executed by a processing device, cause the processing device to:
   execute a hypervisor;
   detect, via the hypervisor, that a virtual machine has written to a flag, wherein the flag is stored in a portion of a memory accessible by the virtual machine and the hypervisor;
   suspend, via the hypervisor, execution of the virtual machine;
   initiate, via the hypervisor, after the suspending, a backup procedure to save the current state of the virtual machine;
   read, via the hypervisor, after the initiating of the backup procedure, a value of the flag;
   in response to determining that the value of the flag read by the hypervisor equals a first value, resume, via the hypervisor, execution of the virtual machine prior to receiving a backup status message regarding the backup procedure; and in response to determining that the value of the flag read by the hypervisor equals a second value, wait, via the hypervisor, to resume execution of the virtual machine until receiving a backup status message indicating that the backup procedure was successful.

14. The non-transitory computer-readable medium of claim 13 wherein the flag is written to by the virtual machine prior to the virtual machine writing into a portion of the memory that is write-protected for the virtual machine.

15. The non-transitory computer-readable medium of claim 13 wherein the flag is written to by the virtual machine prior to the virtual machine accessing an input/output port.

16. The non-transitory computer-readable medium of claim 13 wherein the flag is written to by the virtual machine prior to a hypercall made by the virtual machine.

* * * * *